W. WRIGHT.
COMBINED TYPE WRITING AND COMPUTING MACHINE.
APPLICATION FILED FEB. 12, 1912.

1,251,725.

Patented Jan. 1, 1918.
4 SHEETS—SHEET 1.

W. WRIGHT.
COMBINED TYPE WRITING AND COMPUTING MACHINE.
APPLICATION FILED FEB. 12, 1912.

1,251,725.

Patented Jan. 1, 1918.
4 SHEETS—SHEET 2.

FIG. 2.

WITNESSES:
J. A. Brophy
Edward Thomas

INVENTOR:
Walter Wright
BY B. C. Stickney
ATTORNEY

W. WRIGHT.
COMBINED TYPE WRITING AND COMPUTING MACHINE.
APPLICATION FILED FEB. 12, 1912.

1,251,725.

Patented Jan. 1, 1918.
4 SHEETS—SHEET 3.

W. WRIGHT.
COMBINED TYPE WRITING AND COMPUTING MACHINE.
APPLICATION FILED FEB. 12, 1912.

1,251,725.

Patented Jan. 1, 1918.
4 SHEETS—SHEET 4.

WITNESSES:
J. A. Brophy
Edward Thomas

INVENTOR:
Walter Wright
BY B. B. Stickney
ATTORNEY

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,251,725.   Specification of Letters Patent.   Patented Jan. 1, 1918.

Application filed February 12, 1912. Serial No. 677,046.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to the connections between the keys and the computing wheels or members, and is of special value in combined typewriting and computing machines.

The invention is shown as applied to an Underwood typewriting machine in connection with a computing mechanism of the key-driven type, in which a master-wheel operates *seriatim* upon the computing wheels, and rotates each an amount varying according to the key struck.

The master wheel, since it is operable by any of the computing keys, is usually normally disconnected from said keys, and liable to become accidentally turned. Moreover, both the master wheel and the devices connected thereto gather momentum during the key stroke, and are liable to overthrow; and to minimize this liability, as well as to hold the master wheel normally against accidental movement, it has been proposed to employ powerful spring detents; one important function of the latter being to position the master wheel and computing wheel with exactness after each actuation thereof.

These detents are objectionable, because their resistance must be overcome by the numeral keys, and hence the touch on said keys is rendered unduly harsh, which is a great objection in a combined typewriting and computing machine. This is particularly the case where a separate detent is provided for the master wheel, and individual detents for the computation wheels, as this doubles the resistance at the keys. This objection is especially present when tens are carried from one adding wheel to another.

One of the principal objects of the present improvements is to minimize or avoid the necessity of incurring this great resistance to the key stroke; and to this end, such a connection is provided between the keys and the master wheel that the latter, although operable by any numeral key, is nevertheless normally locked against rotation. Each key unlocks the master wheel, and, at the same time, becomes positively connected thereto, so that the master wheel is always under positive control; and at the conclusion of the stroke of the master wheel, in each instance, the same is accurately positioned and again locked, so that there is no possibility of overthrow or of accidental rotation of the wheel from any cause. These movements occur preferably without the employment of any springs or other resistance-producing devices; and are positively effected by gear connections from the keys. Moreover the individual computing wheels are also normally locked against rotation, as well as accurately positioned, without the employment of objectionably strong detents, and preferably without resorting to springs for this purpose.

The parts may be made small and light, and the touch upon the numeral keys of the computing typewriter may be lightened substantially, so that they are about as easy to operate as the alphabet keys thereof.

The master wheel shaft or driver is preferably normally held locked by a universal lock which, on the depression of any numeral key, is disabled and at the same time, an individual lock operated by that key is thrown in to hold said shaft. This individual lock is herein shown as a Geneva lock on a gear wheel rotated by the key. On the hub with this Geneva lock, are shown teeth proportionate in number to the digit which the type operated by the key will print. As the Geneva lock releases the gear wheel, these teeth mesh with a gear on the master wheel shaft and rotate said shaft to an extent depending on the number of said teeth. At the moment said master wheel shaft is rotated by the last of said teeth, it is locked again preferably by another Geneva lock also formed on said hub.

The key may now descend idly as far as the computing mechanism is concerned (in the preferred form of mechanism as is disclosed herein) and the universal bar of the typewriter escapement is preferably operated about the time the key is relieved of the load of driving the computing wheels; and after this, the type makes its imprint on the platen.

On the return stroke of the key, a lock preferably the universal lock, holds the master wheel shaft.

It will be apparent that in the form of the invention above described, the master wheel shaft is always either locked or in mesh with a gear that rotates it; so that said shaft is always positively controlled. Preferably the gear wheel operated by the type key (and above described as carrying the Geneva locks) is turned by a toothed segment driven by the key and makes a full rotation every time a type key is fully depressed. After such full rotation said gear wheel is idle on the return stroke of the key and is locked in such idle position by a Geneva lock which said driving segment forms with it.

When this form of the invention is used, a cam member is preferably provided which positively sets said gear wheel, so that on the next down stroke of a key, the gear wheel will mesh with teeth on the driver attached to the key. It will be noted that most parts have rotative movement, and that said rotative movement is always in the same direction. Both of these features conduce to easy running of the mechanism.

The master wheel shaft, in the preferred construction above described, is always locked or in mesh with the gear wheel operated by the type key, and as this gear wheel always rotates with any movement of the key, until it has reached its idle position toward the end of the down stroke of the key, the mechanism will be driven equally forward and backward by any incomplete operation of said key. When this feature of the invention is included in a machine, it is practically impossible to strike a key lightly so that a figure is computed but not printed. It is preferable, however, to add a full stroke mechanism to each numeral key, so that such incomplete operation of a key is impossible.

The fact that the master wheel shaft is always locked, unless in mesh with the driving mechanism, enables the machine to operate without having to overcome strong detent springs. It will also be noted that the computing mechanism is positively moved almost throughout its movements, and that the parts one after another gather momentum. Moreover the parts at the end of the stroke of one key are ready for the next stroke, so springs or other arrangements for resetting parts can be avoided.

This invention, in its most complete form, therefore, provides a simple, light positive drive for computing wheels, economical to build and to maintain and easily applicable to existing forms of typewriting machines if so desired.

Other features and advantages will hereinafter appear.

In the accompanying drawings.

Figures 1, 8, 9:
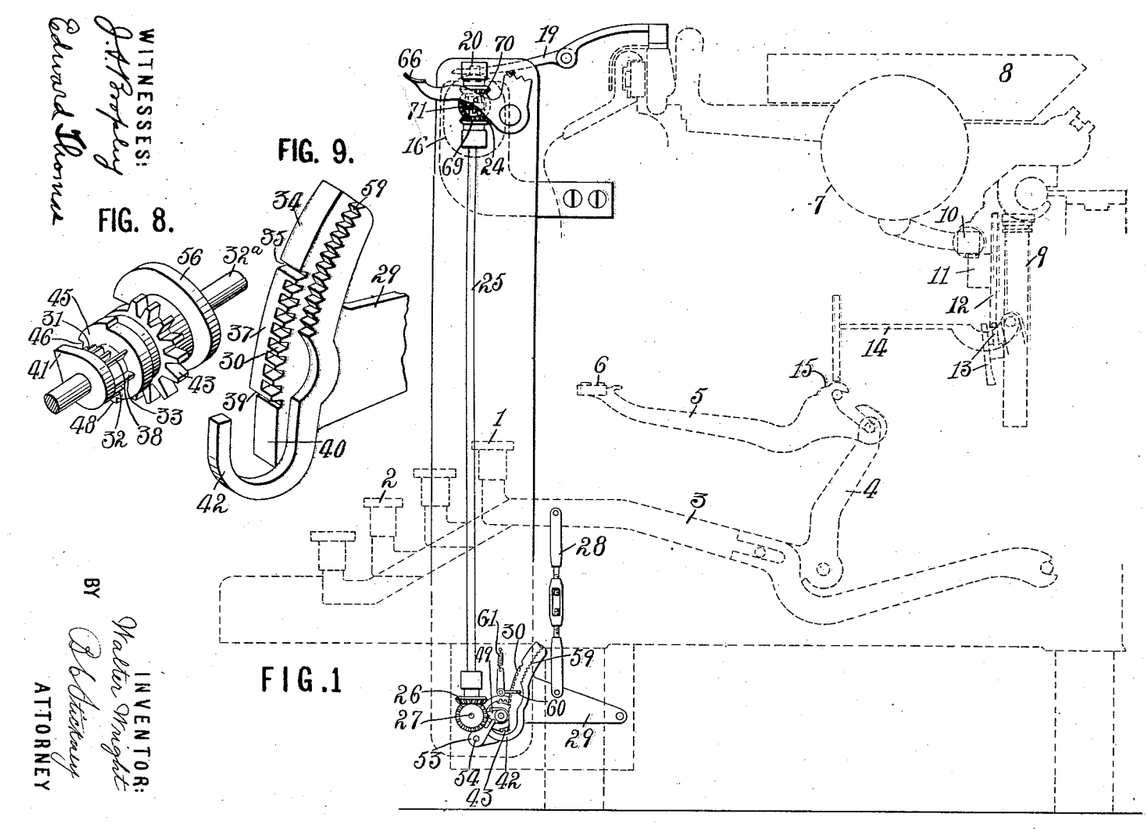
Figure 1 is a diagrammatic side view of an Underwood typewriting machine, showing my invention as applied thereto.
Fig. 8 is a perspective view of a locking and driving wheel operated by a driver.
Fig. 9 is a perspective view of part of the driver.
Figure 2:
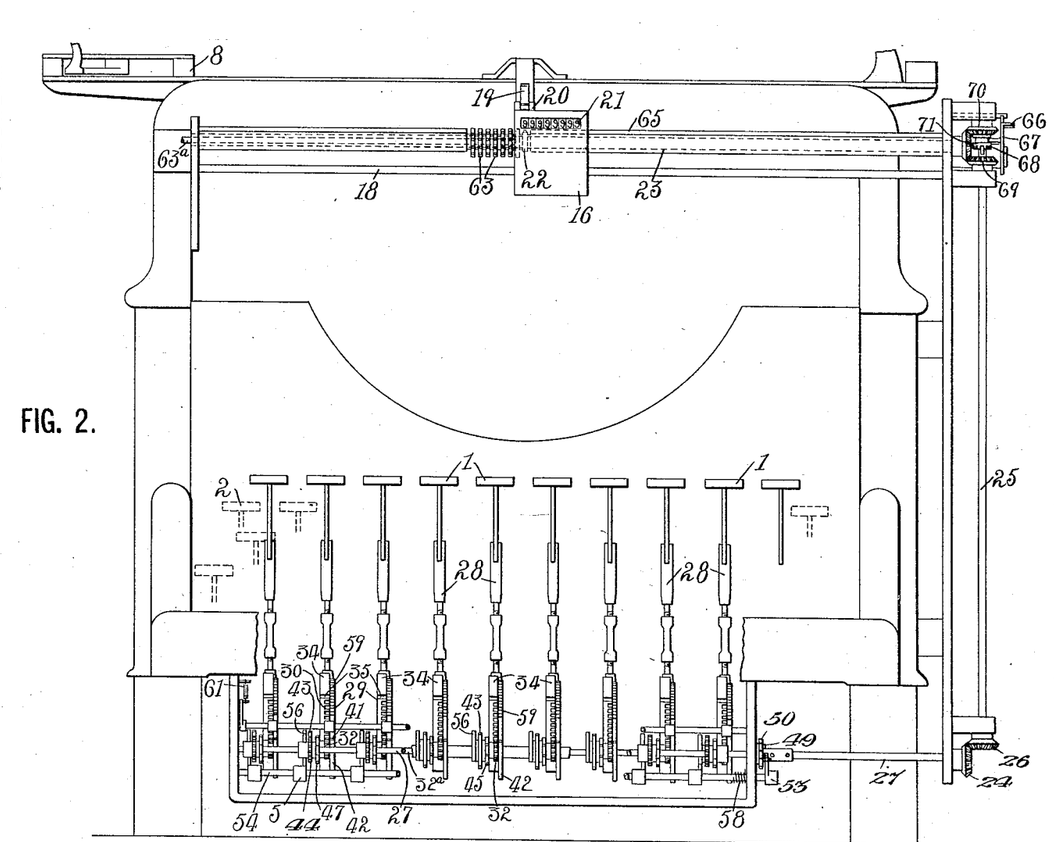
Fig. 2 is a similar front view of the same.

In the drawings, numeral keys 1 and character keys 2 depress levers 3 to operate bell cranks 4 to swing type bars 5 upwardly and rearwardly, causing type 6 to strike against the platen 7 on the carriage 8. The carriage is drawn forward by a spring barrel 9, and is controlled in its movement by a rack 10, meshing with a pinion 11 on the hub of an escapement wheel 12. This escapement wheel is controlled by dogs 13 operated by a universal bar 14 which is struck by heels 15 on the type bars 5, as the type approach the platen.

Figures 3, 7:
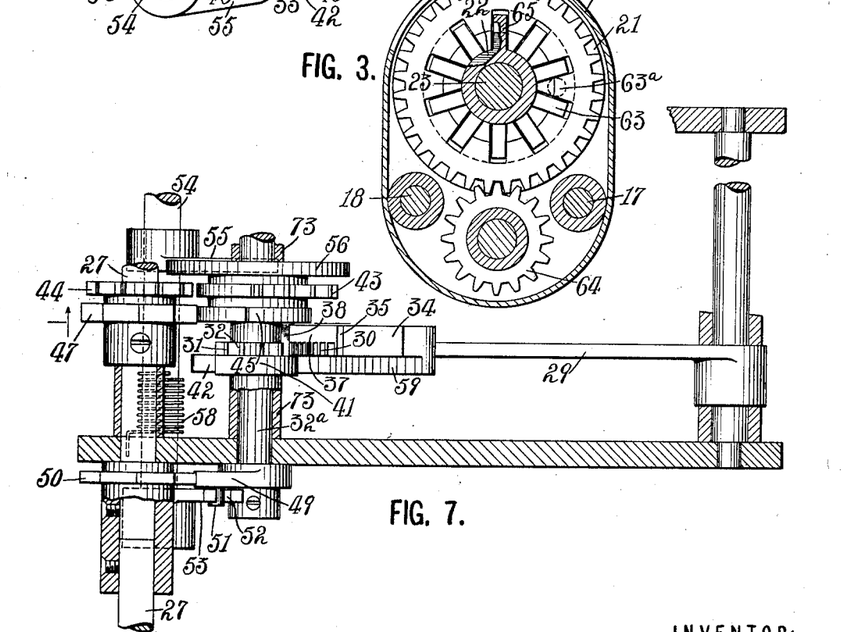
Fig. 3 is a section through the totalizer.
Fig. 7 is a plan view of the connections between a driver and the master wheel driving shaft.

A totalizer 16 slides on bars 17 and 18 at the front of the machine and travels along them with the carriage from which it is driven by an arm 19 resting in a yoke 20 on said totalizer 16. In said totalizer number wheels 21 are driven by a master wheel 22 mounted on a shaft 23, extending transversely of the typewriter. This shaft 23 is turned by the numeral keys in a manner to be presently described, through gears 24, shaft 25, gears 26 and main or computing shaft 27.

From each numeral key, there depends an adjustable link 28 which is pivoted on a segment or driver 29. On the arcuate surface of this segment are cut teeth 30 over part of its length.

These teeth are arranged to mesh with teeth 31 on a mutilated gear wheel 32 and drive it; said gear wheel is loose on the shaft $32^a$. At the upper end of the toothed section of said segment is a raised surface 34 equal in height to the teeth. Most of the teeth in this segment extend only part way across the surface, as seen in Fig. 9; and the part 37 of the segment across which they do not extend is the same height as the arcuate surface 34 at the end of the segment. The two hollows or grooves 35 and 39 at opposite ends of the series of teeth 31, however, extend entirely across the segment.

The gear wheel 32, whose teeth mesh with this segment, has in the present case, eight of its teeth extending only part way across the section of the wheel which meshes with the segment, and the two remaining teeth 33 and 38 which form the boundaries of the arc from which the teeth are removed, extend entirely across.

The construction of the segment is best seen in Fig. 9, and the construction of the gear wheel in Fig. 8. From this it will be seen that, when a segment is depressed by the operation of its numeral key, its teeth rotate the gear wheel until the broad tooth 33 sinks into and rises out of the deep groove 35 in the segment. Any further depression of the numeral key locks the gear wheel, because the broad tooth 33 rides up on the raised flat surface 34 of the segment and slides on said surface.

When the numeral key is released so that it returns upward, the broad tooth 33 slides over surface 34, until it reaches groove 35, where owing to the slight friction of the various parts, the broad tooth 33 will not rotate to mesh with the groove or depression, but will ride over on to the broad flat surface 37 of the segment beside the teeth 30, until the broad tooth 38 of the gear wheel reaches the depression 39 of the segment.

Beyond this depression 39 is a flat portion 40 on the segment somewhat similar to the portion 34 of the upper end, but lower in height; thus permitting the mutilated gear wheel to rotate its tooth 38 slightly, so that on the next depression of the key, said tooth 38 will mesh with the first of the teeth 30 on the segment.

Figure 4:
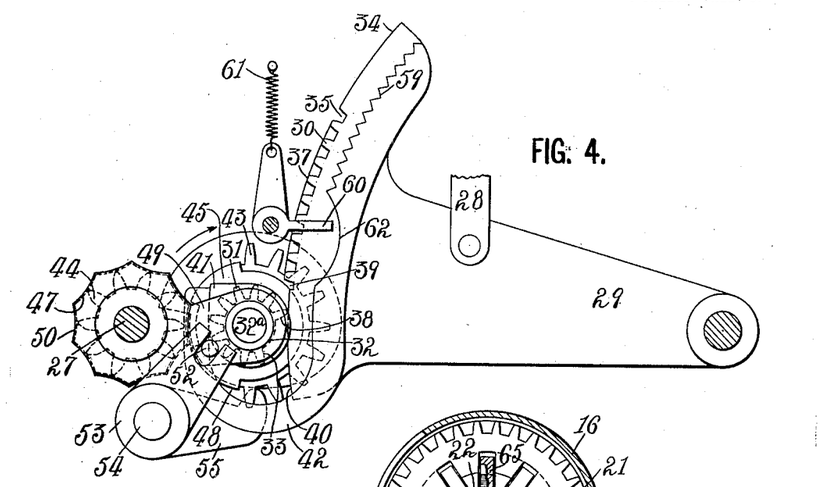
Figs. 4, 5 and 6 illustrate a driver in successive positions, when being depressed by the operation of a numeral key.

To insure this meshing, an egg-shaped cam 41 is fastened adjacent the gear wheel 32 and is arranged when the numeral key rises and brings the segment to the upper limit of its stroke, to be struck by an arm 42 extending upwardly from said segment. This, as best seen in Fig. 4, holds the tooth 38 in position to be struck by the first of the teeth 30 if the segment 29 is again depressed. Fast on the gear wheel 32 is a second mutilated gear having teeth 43 proportionate to the numeral key operating it. In Figs. 4 to 10, this gear wheel illustrated is the one employed for the numeral key "9" and consequently has nine teeth. These teeth 43 are arranged to strike the teeth 44 of which there are ten, on the main shaft 27, and which drives the master wheel as heretofore described. Thus a complete revolution of the gear wheel 32, shown in these figures aforesaid, will turn said main shaft nine-tenths of one revolution.

Between the teeth 31 and the teeth 43, as best shown in Fig. 8, is a cam 45 which is arranged to coöperate as a Geneva lock with the curved surfaces on a wheel 47 fast on main shaft 27. This cam 45 is interrupted at 46.

It will be observed in Fig. 4 which represents the parts just at the beginning of the stroke of the numeral key, that said broken away portion 46 of cam 45 is opposite one of the surfaces on wheel 47, and thus so far as this cam 45 is concerned, the main shaft is permitted to revolve freely in that position. The instant, however, the parts move from the Fig. 4 to the Fig. 5 position as occurs when a numeral key begins to move downward, the raised portion 48 of the cam 45 swings in front of the curved surface 47 (seen in dotted lines in Fig. 5 and in full lines in Fig. 6) and locks the main shaft against driving. At the point, where a tooth 43 moves up to contact with tooth 44 on the main shaft, the cam 45 is again cut away, so as to permit the main shaft to turn as it is driven by said teeth 43, and after it is turned by said teeth it is again locked by the portion 48 of said cam 45; thus locking the main shaft again until the cut away portion 46 arrives opposite said shaft. Thus it will be seen that unless the numeral keys are in their idle positions, the main shaft is either positively turned or positively locked by the moving numeral key.

A universal Geneva lock 49 is provided at one end of the main shaft drive mechanism to coöperate with a second curved surfaced wheel 50 fast on said shaft 27; thus locking it. On this universal lock 49 is formed a pin 51 which rides in a cam slot 52 on an arm 53 fast on a rock shaft 54. On this rock shaft are also fastened cam fingers 55, one for each segment, and these cam fingers are operated by cams 56 fast on the gears 32, and are also arranged with reference to the gears 43, (which, it will be remembered, are also fast on said gears 32) so that the universal lock 49 is swung out free from the surfaces 50 during the time that the teeth 43 are in mesh with the teeth 44 on the main shaft and are driving it. Said finger is allowed to fall back against the cut away portion 57 of said cam surface after the last tooth 43 has meshed with the teeth 44 on the main shaft; thus again locking the parts.

Thus it will be seen that the universal lock holds the main shaft always locked when it is in idle position, that is to say, the universal lock always holds the main shaft locked unless the main shaft is otherwise locked or is being positively turned.

All the parts between the cam 41 and the cam 56, as seen in Fig. 8, form a unit which turns as a sleeve loose on shaft 32ª, and there is one such unit for each numeral key. Except for the varying number of teeth 43 and the varying cam parts 45, 46 and 48, these units may be identical for all the numeral keys. Figs. 10 to 18 show the arrangement of the cams 45, 48 and cut away portion 46 on the driving gears 43 connected with the numeral keys "9" to "1"; the gear for key "1" having one tooth, for key "2" two teeth, etc.

The operation may be summed up as follows:

The numeral key struck depresses a segment 29, the low arcuate surface 40 of which holds the gear teeth 31 locked until the depression 39 is reached, when the teeth 30 mesh with the teeth 31 and rotate the gear wheel 32 carrying the teeth 31. This gear wheel 32 moves with it its cam 45 to lock the main shaft, and its cam 56 in the meantime, is moving the universal locking member 49 out of effective position. As the gear wheel 32 continues to turn, the teeth 43 moving with it, mesh with the teeth 44 on the main shaft. The cut-away portion 46 of the cam 45 here comes into play, permitting the drive shaft to be rotated, and, when the last of the teeth 43 has passed the main shaft, the end 48 of the cam 45 again locks the main shaft. When the numeral key has depressed the segment through its normal stroke, the gear wheel 32 with the teeth 31 will have made one complete revolution and further depression of the key has no effect on the mechanism. The universal lock is swung back by its spring 58 to lock the main shaft, and the raised surface 34 of the segment will lock the gear wheel 32 against further rotation.

If now the numeral key is released, the key lever will rise bringing up the segment again. Owing to slight friction of parts, the tooth 33 will fail to mesh with the broad notch 35, because it lies outside the point circle of the segment teeth, and the gear wheel 32 will then be locked against meshing at all by the side 37, until at the very end of the segment's stroke, the arm 42 strikes the cam 41 and gives the gear wheel 32 a slight turn so that its tooth 38 is in position to be struck next time by the first tooth on the segment.

Figures 5, 6, 10, 11:
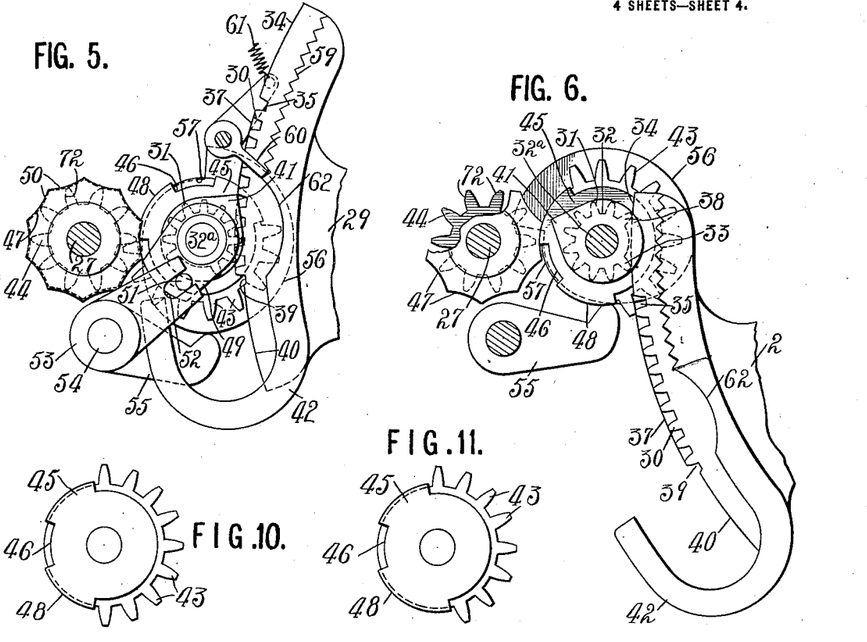
Figs. 10 to 18 are views of the driving gears operated by the segment, showing the different gears for the numeral keys from "9" to "1".
Figure 12:
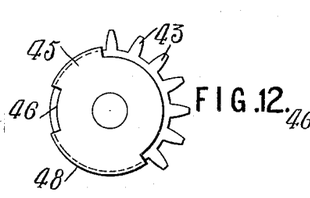
Figure 13:
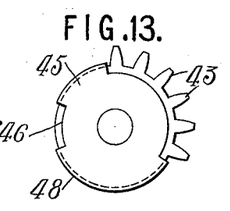
Figure 14:
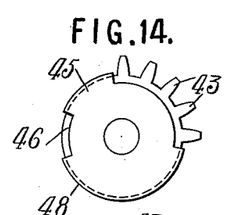
Figure 15:
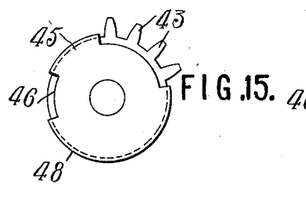
Figure 16:
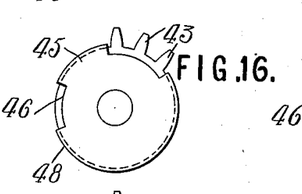
Figure 17:
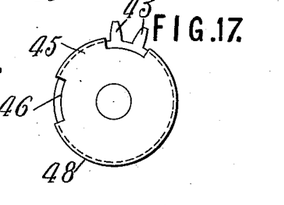
Figure 18:
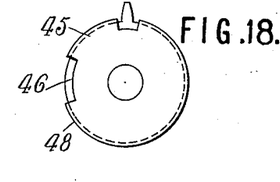

In order to prevent any incomplete operation of the computing mechanism, a full stroke mechanism is provided for each segment, consisting of teeth 59 cut on it approximately at an angle of forty-five degrees, over which a double-acting pawl or arm 60 is arranged to slide, as shown best in Fig. 5, where it will be seen that, if the segment is depressed, the teeth 59 will slide easily past the arm 60, which is pressed against them by means of a spring 61.

If, however, the key should be released and the segment starts to return at an intermediate point, some tooth 59 will lock against the pawl 60, as seen in Fig. 5. After the segment has completed its full downward stroke, and the last tooth 59 has passed beyond the arm 60, said arm will have full play again, and the spring 61 will swing it horizontal so that the teeth striking the rock arm 60 will turn said arm 60 in the reverse direction and slide over it easily. A cut away portion 62 beyond the end of the teeth at the bottom of the segment permits the rock arm to be restored to its operative position by spring 61, as seen in Fig. 4. The totalizer herein shown is that disclosed in prior application No. 642,183, filed August 3, 1911, in which a carry-over mechanism for the numeral wheels comprises gears not shown, couplers 63, and a coöperating wheel 64 which together form a carry-over train, so that each numeral wheel moves the one next higher one unit space every time a numeral wheel turns to read zero.

An alining bar 65 holds the computing wheels alined which are to the right of the master wheel 22, and any couplers 63, which may be to the left of the totalizer, and so not in engagement with any computing wheel, are alined by a bar 63ª mounted on the totalizer and traveling with it.

A handle 66 operates a clutch 67, consisting of a wheel 68 splined on shaft 25 which may be made to engage with either spur 69 or 70, which run loosely on said shaft and mesh with gear 71 on the master wheel shaft 23. Thus by shifting the clutch up or down, the mechanism may be made either to add or subtract, or it may be set in neutral position so that the computing wheels will not be operated.

It will be noted that the main shaft 27 is always driven in one direction, so that only one side of the teeth 44 is shown of odontoid form. The non-driving side of each tooth is preferably cut away as seen at 72, so that the first tooth 43 will always strike the proper tooth 44.

In Fig. 7 spacing collars 73 are shown for properly spacing the gear wheels and allied parts operated by one numeral key from those operated by the next.

It will be observed that among the advantages of my machine when applied to an Underwood typewriter, is the fact that the computing mechanism is operated during the early or middle part of the stroke of a numeral key, and that the universal bar which operates the carriage escapement is operated at or near the end of movement of a type bar, so that the fingers in striking a key, do not have at once the heavy load both of driving the computing mechanism, and of operating the universal bar of the typewriter. In fact the very beginning of the stroke of a numeral key is absolutely free, so that the key lever and associated parts may attain some momentum before any load at all comes on the lever, and then gradually the lever begins to operate the various other parts.

Moreover, if the full stroke mechanism should fail to operate, the computing mechanism would still compute only numbers printed by the type keys, for it will be seen that if a key is partly depressed and then released, it will turn the main shaft and master wheel with it in both directions. This is so, because the gear wheel driving the main shaft is either positively driven or positively locked by a numeral key, and if the key is not moved far enough after turning the computing wheel to lock the parts, the gearing will rotate the computing parts back to their previous position.

Variations may be resorted to within the scope of the invention, and portions of the improvements may be used without others.

Having thus described my invention, I claim:

1. The combination with a master wheel, and computing wheels selectively operated by said master wheel, of keys, a shaft for driving said master wheel turned by said keys, a universal lock for holding said shaft locked, said lock released by the operation of any key, and key controlled locks holding said shaft locked during the movement of any numeral key while not positively turning said shaft.

2. The combination with computing wheels, of keys, a partly toothed driver moving with each key, a driving gear wheel turned by the toothed portion of said driver and locked by the remaining portion and inoperative on one stroke of said key, and a bar moved by said key to positively move said gear wheel to mesh with said driver on the next stroke of said key.

3. The combination with computing wheels, of keys, a partly toothed driver moving with each key, a driving gear wheel turned by the toothed portion of said driver and locked by the remaining portion and inoperative on the up stroke of said key, and a bar moved by said key to positively move said gear wheel to mesh with said driver.

4. The combination with a master wheel, and computing wheels selectively rotated by said master wheel, of keys, a shaft for driving said master wheel, gears fast on said shaft, one for each key, said gears rotated by said keys to turn said shaft, a universal lock for said shaft released by the operation of any of said keys, and key controlled locks holding said shaft locked during the movement of any numeral key while not positively turning said shaft by said gears.

5. In a combined typewriting and computing machine, the combination with numeral keys of a master wheel, a series of computing wheels, gears completely driven by said numeral keys before they are completely operated, mutilated gears always revolving in the same direction having teeth proportionate to the key operating them, said gears driven by said first gears through a complete revolution at each operation of their keys, and a shaft turning said master wheel to an extent governed by said mutilated gears.

6. In a computing machine, the combination with a numeral key, of a reciprocating partly toothed driver operated thereby, a mutilated gear driven by said teeth during a part of an operation of said driver, a surface on said driver to limit the movement of said gear after a drive, but allowing lost motion, and means carried by said driver to engage a part carried by said gear to move and lock said gear, at the end of an operation by said driver, in such position that its teeth will mesh with the teeth of said driver on its next reciprocation.

7. In a combined typewriting and computing machine, the combination with numeral keys, and segments operated thereby, of a master wheel, a series of computing wheels, a mutilated gear wheel rotated and stopped by a segment before the end of the key stroke, said segment having a smooth periphery at each end to coöperate with the part of said gear wheel from which teeth are missing to form a Geneva lock with said mutilated gear wheel, a master wheel shaft, and a second mutilated gear turning with said first mutilated gear and rotating said master wheel shaft to an extent determined by the number of teeth on said second mutilated gear wheel.

8. In a computing machine, the combination with a mutilated gear, and a computing wheel driven thereby and forming therewith a Geneva lock, said lock having a break to permit said computing wheel to be rotated when said mutilated gear is idle, of a lock normally holding said computing wheel, but released by the operation of said mutilated gear.

9. In a computing machine, the combination with a plurality of driving wheels, and a universal shaft whereon they are fast, of a plurality of mutilated gears each operating its driving wheel and forming a Geneva lock therewith, except in its idle position, a lock holding said shaft when said gears are idle, and means releasing said lock on the operation of any mutilated gear.

10. In a computing machine, the combination with a numeral key and a segment operated thereby, having toothed and toothless portions, of a mutilated gear driven by said toothed portion in one direction only and locked by said toothless portions, a master wheel, a shaft for turning said master wheel, a gear wheel fixed on said shaft, means for turning said shaft gear by said mutilated gear, and means for positively moving said mutilated gear so that its teeth will engage with the teeth of said segment on its operative stroke.

11. In a computing machine, the combination with a universal shaft and driving wheels fixed thereon, of a mutilated gear for turning each driving wheel and forming a Geneva lock therewith while turning idly but leaving it free when at rest, a universal lock for said shaft when said gears are at rest, and separate means controlled by said mutilated gears for unlocking said universal lock when said shaft is turned by one of said gears.

12. In a computing machine, the combination with toothed segments, and operating keys therefor, of mutilated gear wheels each rotated one revolution at each operation of a key by the teeth on the corresponding segment, said teeth occupying the center of the arc on said segment, said segment having toothless portions at each end thereof to lock said gear, mutilated gears fast on said first gears, and each having teeth proportionate to the key operating them, and a master wheel drive driven by said second mutilated gears.

13. In a computing machine, the combination with keys, of a shaft, means operated by said keys for positively driving said shaft and positively locking it during any idle portion of the stroke of said keys; said means holding said shaft free from said key-operated locks when said keys are in their normal idle position, and a universal lock normally holding said shaft locked and released by the operation of any of said numeral keys.

14. In a combined typewriting and computing machine, the combination with numeral keys, of computing wheels, a segment operated by each numeral key, a gear wheel having a number of teeth dependent on the numeral key operating it, positively turned during part of the stroke of said key and positively locked during the remainder of the stroke of said key by said segment, so that the end of the stroke of the key is idle, a master wheel selectively operating said computing wheels, and a master wheel shaft positively turned by said gear wheels and positively locked by them during the idle stroke of the keys.

15. In a computing machine, the combination with a key, of a toothed segment operated thereby, a gear normally locked by said segment, and positively driven when the segment moves, a main shaft driven by said gear, and means, revolving as a unit with said gear for locking and unlocking said main shaft.

16. In a computing machine, the combination with a reciprocating toothed member, of a gear wheel driven thereby and always rotating in one direction, so that said reciprocating member has an idle stroke, and means on said reciprocating member for positively moving said gear so that said gear will positively mesh with said teeth on the operative stroke after an idle stroke.

17. In a computing machine, the combination with a reciprocating toothed member, of a gear wheel always driven or locked thereby and always rotating in one direction, so that said reciprocating member has an idle stroke, and means on said reciprocating member for positively moving said gear so that said gear will positively mesh with said teeth on the operative stroke after an idle stroke.

18. In a computing machine, the combination with a master wheel shaft having gears thereon, of key-operated gear wheels, one for each gear, teeth and Geneva locks on said gear wheels whereby said gear wheels are always in mesh with said gears or always locking them as they move, and a separate universal lock for said master wheel shaft.

19. In a computing machine, the combination with numeral keys, computing mechanism controlled thereby, connections between said keys and said computing mechanism including wheels turned through part of a revolution and also including wheels always turning in the same direction and turned through a full revolution at every operation thereof under control of said keys, so that said last-named wheels when arrested are in position to continue to turn in the same direction when next operated.

20. In a computing machine, the combination with a driving shaft and a universal lock therefor, of a plurality of individual locks for said shaft, and means fast to each individual lock adapted to release said universal lock after the individual lock is effective and vice versa.

21. In a computing machine, the combination with a key and a master wheel shaft, of a rack operated by said key, a gear wheel engaged by said rack after said key is well started on its downward stroke, said wheel so proportioned that it makes nearly a complete revolution before the key approaches the end of said downward stroke, a Geneva member beyond said rack arranged to arrest said gear and hold the same during the remainder of said downward stroke, and a Geneva member on said rack to complete a full revolution of said gear at the end of the upward stroke of said key and hold said gear in its normal position.

22. In a computing machine, the combination with numeral keys and a master wheel shaft, of a rack moved by each key, a gear engaged by said rack to be turned after said key is started, a Geneva member fast to said gear forming a lock effective to hold said shaft as said gear turns, a gear fast to said first gear arranged to turn said shaft after said Geneva lock becomes ineffective, a Geneva member effective to lock said shaft after it is turned by said second gear, and a cam fast to said gears arranged to normally hold said shaft locked but to release said shaft whenever any gear is operated.

23. In a computing machine, the combination with a computing shaft, of a gear always reciprocating in one plane for driving said shaft, a driver driven by said gear always in one direction and always remaining in the same plane, and comprising a number of teeth proportional to the number which the driver is to compute, a coöperating gear wheel on the computing shaft driven by said driver, a key for operating said first-named gear, a Geneva lock for positively preventing overthrow of its driver by the gear, and a Geneva lock for positively preventing overthrow of the computing shaft by the driver.

24. In a computing machine, the combination with a computing shaft, of a gear always reciprocating in one plane for driving said shaft, a driver driven by said gear in one direction and always remaining in the same plane and comprising a number of teeth proportional to the number the driver is to compute, a coöperating gear wheel on the computing shaft driven by said driver, a key for operating said first-named gear, a Geneva lock for preventing overthrow of the driver by its gear, and a lock for positively preventing movement of the driver by the return of the gear.

25. In a computing machine, the combination with a computing shaft, of a gear always reciprocating in one plane for driving said shaft, a driver driven by said gear in one direction and always remaining in the same plane and comprising a number of teeth proportional to the number the driver is to compute, a coöperating gear wheel on the computing shaft driven by said driver, a key for operating said first-named gear, a Geneva lock for preventing overthrow of the driver by its gear, a lock for positively preventing movement of the driver by the return of the gear, and a Geneva lock for holding the computing shaft while the driver is turning, unless the computing shaft is driven thereby.

26. In a computing machine, the combination with a numeral key and a gear driven thereby, always remaining in a single plane, of a driver driven by said gear, always rotating in one direction and always remaining in the same plane, a computing shaft driven by said driver, and a Geneva lock for holding the driver against operation during the return movement of the key.

27. In a computing machine, the combination with a computing shaft, of a locking and driving unit associated with said shaft, a lock normally holding said shaft locked, and means under the control of said unit for positively unlocking said shaft, positively turning it, positively locking it against overthrow momentarily, and finally positively relocking it and leaving it locked.

28. In a computing machine, the combination with a computing shaft, of a gear always reciprocating in one plane for driving said shaft, a driver driven by said gear always in one direction and always remaining in the same plane with said gear and comprising a number of teeth proportional to the number which the driver is to compute, a coöperating gear wheel on the computing shaft driven by said driver, and means for holding said shaft locked when not so driven.

29. In a computing machine, the combination with a computing shaft, of a gear always reciprocating in one plane for driving said shaft, a driver driven by said gear always in one direction and always remaining in the same plane with said gear and comprising a number of teeth proportional to the number which the driver is to compute, a coöperating gear wheel on the computing shaft driven by said driver, a key for operating said first-named gear, a lock for positively preventing overthrow of its driver by the gear, a lock for positively preventing overthrow of the computing shaft by the driver, and means for operating said locks by said gear.

30. In a computing machine, the combination with a computing shaft, of a gear always reciprocating in one plane for driving said shaft, a driver driven by said gear always in one direction and always remaining in the same plane with said gear, and comprising a number of teeth proportional to the number which the driver is to compute, a coöperating gear wheel on the computing shaft driven by said driver, a key for operating said first-named gear, a lock for preventing overthrow of the driver by its gear, a lock for positively preventing movement of the driver by the return movement of the gear, and means for operating said locks by said gear.

31. In a computing machine, the combination with a computing shaft, of a gear always reciprocating in one plane for driving said shaft, a driver driven by said gear always in one direction and always remaining in the same plane with said gear, and comprising a number of teeth proportional to the number which the driver is to compute, a coöperating gear wheel on the computing shaft driven by said driver, a key for operating said first-named gear, a lock for preventing overthrow of the driver by its gear, a lock for positively preventing movement of the driver by the return movement of the gear, a lock for holding the computing shaft while the driver is turning, unless the computing shaft is driven thereby, and means for operating said locks by said gear.

32. In a computing machine, the combination with a numeral key and a gear driven thereby always remaining in a single plane, of a driver driven by said gear, always rotating in one direction and always remaining in the same plane with said gear, a computing shaft driven by said driver, a lock for holding the driver against operation during the return movement of the key, and means for operating said lock by said gear.

33. In a computing machine, the combination with a computing shaft, of a locking and driving unit associated with said shaft, a lock normally holding said shaft locked, means under the control of said unit for positively unlocking said shaft, positively turning it, positively locking it against overthrow momentarily, and finally positively relocking it and leaving it locked, and means whereby said unit always rotates in the same direction.

34. In a computing machine, the combination with a master shaft, of a unitary driving and lock controlling unit therefor, a universal lock for said shaft to prevent rotation thereof when idle, means controlled by said unit to render said universal lock ineffective during rotation of said unit, a gear fast on said shaft to be engaged and driven by said unit during an intermediate part of each rotation thereof, and means fast on said shaft to be engaged and held locked by said unit during rotation thereof when not effective as a driver.

35. In a computing machine, the combination with a plurality of full-revolution digit-determining wheels having teeth proportional to the digits they represent, of a single shaft to be rotated thereby, a plurality of gears fast on said shaft, one gear for each wheel, said gears having teeth to be engaged by the teeth on said wheels to effect a rotation of said shaft during a part of the rotation of each wheel, and a pair of Geneva locking elements for each gear and its wheel to lock said shaft after being rotated by said wheel, one element of each pair being fixed with respect to its associated gear and the other element of the same pair being fixed with respect to its associated wheel.

36. In a computing machine, the combination with a plurality of full-revolution digit-determining wheels having teeth proportional to the digits they represent, of a single shaft to be rotated thereby, a plurality of gears fast on said shaft, one gear for each wheel, said gears having teeth to be engaged by the teeth on said wheels to effect a rotation of said shaft during a part of the rotation of each wheel, a pair of Geneva locking elements for each gear and its wheel, to hold said shaft locked during the initial movement of said wheel and before it becomes effective as a driver, one element of each pair being fixed with respect to its associated gear and the other element of the same pair being fixed with respect to its associated wheel, and a second Geneva member having a fixed relation with respect to each wheel to coöperate with the locking member of the associated gear to lock said shaft after being rotated by said wheel.

37. In a computing machine, the combination with a plurality of full-revolution digit-determining wheels having teeth proportional to the digits they represent, of a single shaft to be rotated thereby, a plurality of gears fast on said shaft, one gear for each wheel, said gears having teeth to be engaged by the teeth on said wheels to effect a rotation of said shaft during a part of the rotation of each wheel, a pair of Geneva locking elements for each gear and its wheel to lock said shaft after being rotated by said wheel, one element of each pair being fixed with respect to its associated gear and the other element of the same pair being fixed with respect to its associated wheel, and a pair of universal Geneva locking elements, one element of said pair being fixed to said shaft and the other element being normally held in locking relation therewith but moved to ineffective position during the rotation of any of said wheels.

38. In a computing machine, the combination with a plurality of full-revolution digit-determining wheels having teeth proportional to the digits they represent, of a single shaft to be rotated thereby, a plurality of gears fast on said shaft, one gear for each wheel, said gears having teeth to be engaged by the teeth on said wheels to effect a rotation of said shaft during a part of the rotation of each wheel, a pair of Geneva locking elements for each gear and its wheel, to hold said shaft locked during the initial movement of said wheel and before it becomes effective as a driver, one element of each pair being fixed with respect to its associated gear and the other element of the same pair being fixed with respect to its associated wheel, a second Geneva member having a fixed relation with respect to each wheel to coöperate with the locking member of the associated gear to lock said shaft after being rotated by said wheel, and a pair of universal Geneva locking elements, one element of said pair being fixed to said shaft and the other element being normally held in locking relation therewith but moved to ineffective position during the rotation of any of said wheels.

39. In a computing machine, the combination, with a key-driven, toothed operating member; of a gear driven by engagement with the teeth on said member at each cycle of movement thereof; means on said operating member co-acting with said gear to lock the latter at the completion of such rotation; and separate co-acting means associated with said gear and said operating member for turning said gear, at the conclusion of each cycle of movement of the operating member, into position for reëngagement by its teeth at the next cycle of movement thereof.

40. In a computing machine, the combination, with a key-driven, toothed operating member; of a gear driven by engagement with the teeth on said member at each cycle of movement thereof; means on said operating member co-acting with said gear to lock the latter at the completion of such rotation; and a cam engageable with said operating member at the conclusion of each cycle of movement thereof, to turn said gear into position for reëngagement with said teeth at the next cycle of movement of the operating member, said gear and said cam comprised in a unitary driving device.

41. In a computing machine, the combination, with a key-driven, toothed operating member; of a gear driven by engagement with the teeth on said member at each cycle of movement thereof; means on said operating member co-acting with said gear to lock the latter at the completion of such rotation; a shaft driven from said gear; co-acting means associated with said shaft and said gear for locking the former when the latter is locked; and separate co-acting means associated with said gear and said operating member for turning said gear, at the conclusion of each cycle of movement of the operating member, into position for reëngagement by its teeth at the next cycle of movement thereof.

42. In a computing machine, the combination, with a key-driven, toothed operating member; of a gear driven by engagement with the teeth on said member at each cycle of movement thereof; means on said operating member co-acting with said gear to lock the latter at the completion of such rotation; a shaft driven from said gear; means associated with said gear for locking said shaft when the gear is locked; and separate means associated with said gear and engageable with said operating member at the conclusion of each cycle of movement thereof, to position said gear for reëngagement with said teeth at the next cycle of movement of the operating member, said gear, said shaft-locking means and said positioning means comprised in a unitary driving device.

43. In a computing machine, the combination, with a key-driven, toothed operating member; of a gear driven by engagement with the teeth on said member at each cycle of movement thereof; means on said operating member co-acting with said gear to lock the latter at the completion of such rotation; a computing shaft; means associated with said gear for locking said shaft when the gear is locked; a gear associated with the first-named gear for driving said shaft, said locking means and both of said gears comprised in a unitary driving device; and means for turning said first-named gear, at the conclusion of each cycle of movement of the operating member, into position for reëngagement by its teeth at the next cycle of movement thereof.

44. In a computing machine, the combination, with a numeral key; of a driver reciprocated thereby and having a portion of its periphery toothed; and a mutilated gear rotatable by said teeth at each active stroke of the driver, said driver having a peripheral surface acting during the return stroke of the driver to hold said gear with its teeth outside of the point circle of the driver teeth, and also having a part arranged to rotate said gear substantially at the conclusion of said return stroke, so as to bring its teeth inside of said point circle for engagement by said driver teeth at the next active stroke of the driver.

45. In a computing machine, the combination, with a numeral key; of a driver reciprocated thereby and having a portion of its periphery toothed; and a mutilated gear rotatable by said teeth at each active stroke of the driver, said driver having separate portions of its peripheral surface respectively and successively co-acting with said gear during the return stroke of the driver to lock said gear in the position into which it was rotated by said teeth and to hold it in such position but allowing lost motion, and also having a part arranged to rotate said gear substantially at the conclusion of said return stroke, so as to bring its teeth inside of the point circle of the driver teeth for engagement by said driver teeth at the next active stroke of the driver.

46. The combination of a toothed gear; a driver having teeth thereon engageable with the teeth on said gear to effect rotation of the latter; means for rendering said gear ineffective to be rotated by the driver teeth, after such rotation has been completed; a key for actuating said driver; and co-acting members connected to said driver and said gear for effecting a further rotation of said gear to a position where it may again be rotated by said driver teeth.

47. The combination with a mutilated gear, of a driver having teeth thereon to engage the teeth of said mutilated gear, so as to rotate said gear, said driver having a surface arranged to engage and hold the teeth of said gear clear of the point circle of said teeth of said driver, so that said driver may pass freely by said gear without actuating the same, said driver also having means to engage a part carried by said gear to force certain of the teeth of said gear into the path of the teeth of said driver and across the point circle thereof, so as to enable the teeth of said driver to once more rotate said gear.

48. In a computing machine, the combination with a master shaft and a plurality of movable driving elements therefor, each driving element being effective as a driver during an intermediate part of its movement only, of a normal lock for the master shaft, initial locks therefor and final locks therefor, said locks including means operative upon initial movement of a driving element, and before its effective movement as a driver, for rendering the normal lock ineffective and an initial lock effective, means operative during the effective driving period of movement of a driving element for rendering said initial lock ineffective, means operative after the effective driving period of movement of said driver for rendering a final lock effective, and means operative at the termination of said driving period for rendering said final lock ineffective and said normal lock effective.

49. The combination with a master wheel, and locking means normally holding the same against rotation; of a set of numeral keys; a driving unit for said master wheel associated with each numeral key, each key always rotating its unit in the same direction and only on its down stroke; and connections under the control of said units for moving said locking means to effective and ineffective positions.

50. In a computing machine, the combination with a key-operated reciprocating segment having a series of teeth on its surface, of a mutilated gear driven by said teeth, a surface on said segment locking said gear after substantially a complete revolution of said gear, a surface adjacent said teeth arranged to coöperate with the teeth bounding the mutilated portion of said gear to lock said gear on the return stroke of said segment, a surface normally holding said gear locked by said bounding teeth but allowing lost motion, and means carried by said segment to engage a part carried by said gear to move said gear and lock the same in a position such that its teeth will positively mesh with said segment teeth on the next reciprocation of said segment.

51. The combination with a reciprocating member and a mutilated gear coöperating therewith, of teeth on said reciprocating member for turning said mutilated gear, a surface on said reciprocating member for locking said mutilated gear against any revolution whatsoever, a surface on said reciprocating member locking said gear against turning more than a limited amount but permitting the teeth on said mutilated gear to either extend across or lie within the point line of the teeth on the member, and means carried by said reciprocating member to engage a part carried by said gear to move and hold said gear locked in a position such that a tooth thereof lies within the point line of the teeth on the reciprocating member.

52. The combination with a rack having teeth lying in one plane therealong, of a driving unit actuated by said rack and having coöperating teeth, an extension on one end of said rack adapted to hold said unit teeth so that they move clear of the point circle of the rack teeth, and means carried by said rack for holding said unit in such a position that a tooth thereof will lie within the point circle of the rack teeth.

53. The combination with a rack having teeth lying in one plane therealong, of a driving unit actuated by said rack and having coöperating teeth, an extension on one end of said rack adapted to hold said teeth so that they move clear of the point circle of the rack teeth, means carried at the other end of said rack for holding said unit in such position that a tooth thereof will lie within the point circle of the rack teeth, and a Geneva locking surface between said holding means and the rack teeth adapted to hold the unit against much motion, but allowing said unit to have its teeth either without or within the point circle of the rack teeth.

54. In a computing machine, the combination with a numeral key, of a driver operated thereby and arranged to move in an arcuate path, said driver having a part of its periphery toothed, and a gear rotatable by said teeth at each actuation of the driver, said driver having a portion of its peripheral surface acting to lock said gear against rotation by said teeth at the conclusion of such rotation, a second locking portion brought into play subsequent to the first-named portion but allowing lost motion of said gear, and a third portion acting subsequently to the second-named portion to directly and positively turn said gear into position for engagement by said teeth at the next actuation of said driver.

55. The combination of a toothed gear, a driver having means thereon engageable with the teeth on said gear to effect a partial rotation of the latter, and also having means for rendering said gear ineffective to be rotated by the first mentioned means after such partial rotation has been completed, a key for actuating said driver, and means on said driver engageable with means carried by said gear to effect a further rotation of the gear to a position such that it may again be rotated by said first-mentioned means.

WALTER WRIGHT.

Witnesses:
WM. H. FREY,
LORENZ L. PRITZL.

Copies of this patent may be obtained for five cents each, by addressing the "Commissioner of Patents, Washington, D. C."